Patented June 16, 1925.

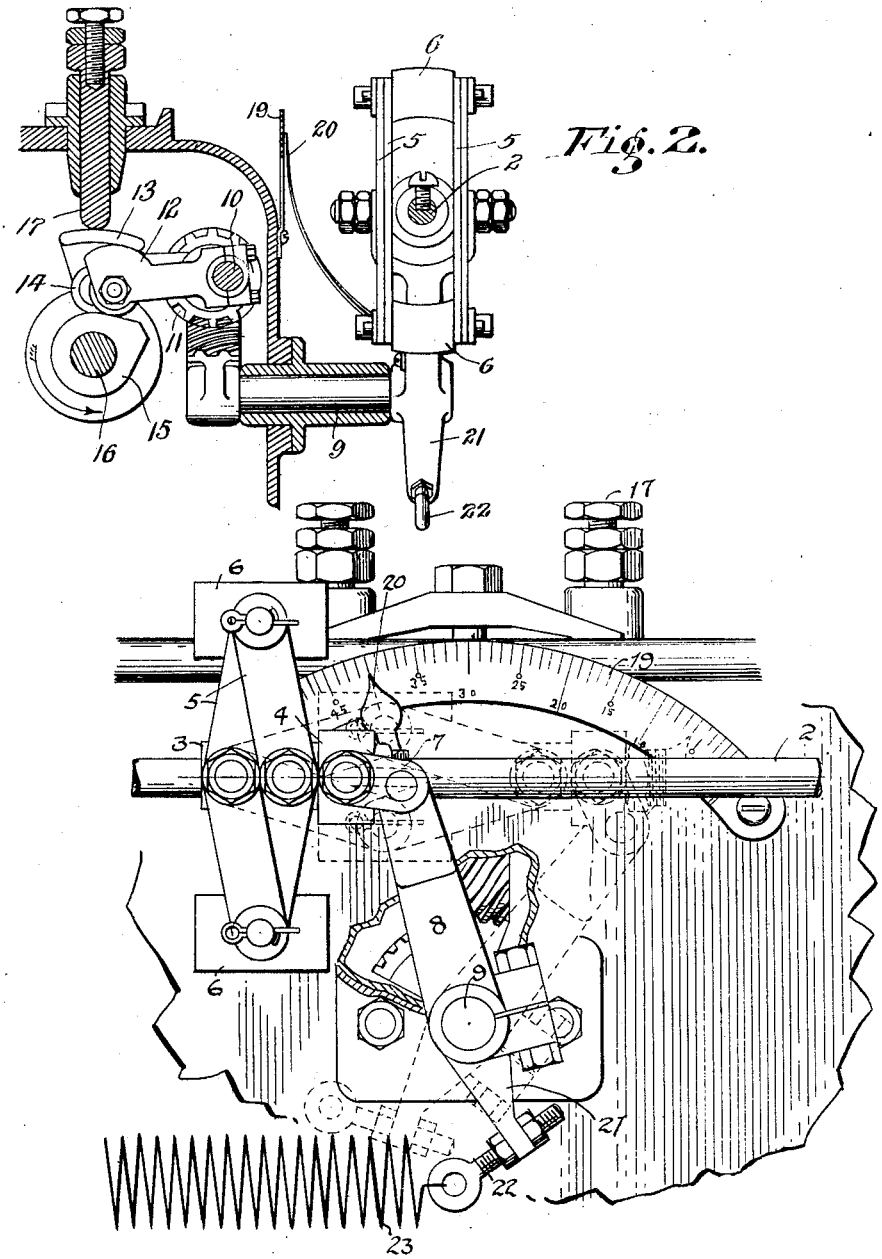

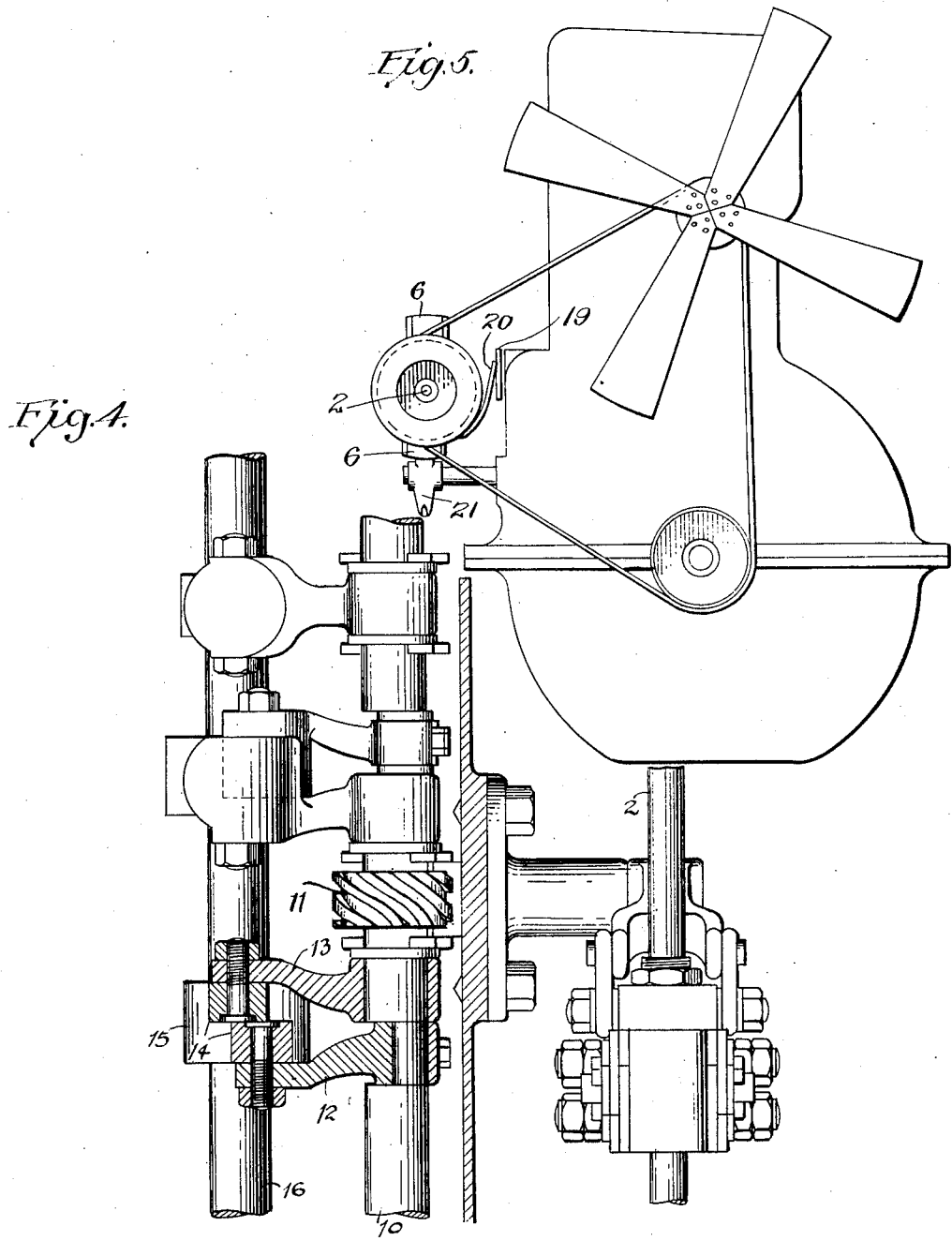

1,542,354

UNITED STATES PATENT OFFICE.

BUNZO ATSUMI, OF TOKYO, JAPAN.

POWER CONTROL IN INTERNAL-COMBUSTION MOTORS.

Application filed March 25, 1921. Serial No. 455,544.

*To all whom it may concern:*

Be it known that I, BUNZO ATSUMI, a subject of the Emperor of Japan, residing at No. 15 Uyenohirokojimachi, Shitaya Ku, city of Tokyo, Empire of Japan, have invented certain new and useful Improvements in a Power Control in Internal-Combustion Motors, of which the following is the specification.

The invention has for an object to enable the control of the power of an internal combustion engine through variation of the period or time of the valve action, and also to enable the improvement of the operation of such engines by the same means.

While various embodiments of the invention are possible a specific application in one possible form only is illustrated, from which its utility in other ways may be readily appreciated. In the present instance, the invention is applied to the automatic control of the exhaust valve, whereby for high speeds the time of exhaust may be materially advanced and the period of opening likewise prolonged, resulting in high efficiency without auxiliary ports; while at the same time, when operating at slow speeds, the expanding gases may be confined to work upon the piston for a greater distance, and thus obtain efficient work from the fuel at all ranges of speed.

My invention is applicable to attain the variation of the time of opening of the exhaust in the engine cycle, progressively as the speed increases or decreases, and it is a further advantage that it may be attained automatically or manually so that the exhaust would be controlled after the manner of the spark or ignition.

Additional objects, advantages and features of invention reside in the construction, arrangement and combination of parts involved in the embodiment of the invention, and its application to use.

In the drawings hereof,

Fig. 2 is an enlarged detail of the valve operating mechanism in position for prolonged opening, involved in high engine speed, Fig. 3 is an elevational detail of the governor, pointer and dial indicating the relation of valve action to piston or crank movement or position, expressed in degrees between the position of the crank and dead center.

Fig. 4 is a top view of the parts shown in Fig. 2, partly in section.

Figure 5 is a front elevation of the engine showing a drive for the shaft 2.

Figure 1:
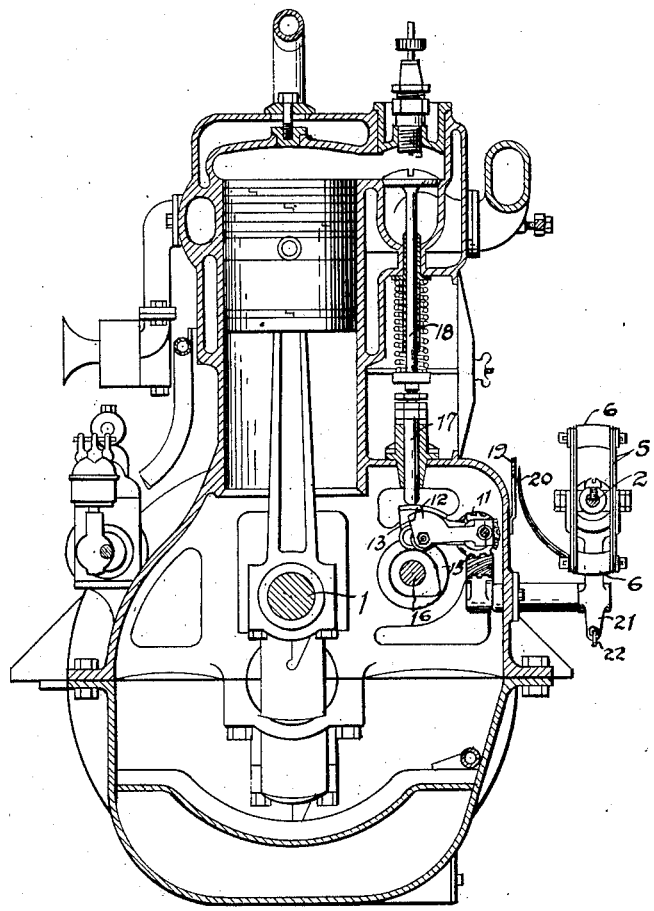
Figure 1 is a vertical sectional view of an engine embodying my invention.

There is illustrated an engine which except for the valve stem and its operating mechanism, may remain as such engines are ordinarily constructed, and includes the usual crank case upon which a cylinder casting is bolted as customary. A crank shaft 1 is mounted centrally beneath the cylinders. Poppet valves 18 of familiar form and mounting are utilized, engaged directly by push pins 17 such as are ordinarily employed, and mounted in the familiar bushings in the top of the crank case beside the cylinders. Beneath the push pins a cam shaft 16 of ordinary form is mounted, but located a distance below the push pins 17.

The thrust of the individual cams 15 is transmitted to the push pins through intermediate oscillating thrust elements or bars 12 and 13, the latter one having a lateral extension at one side concentric with the cam shaft, while the other one 12 is engaged between this extension and the cam. Both elements 12 and 13 are provided with wipers 14 which bear at all times upon the cam 15. The outer ends of the bars are used for their support, being mounted upon a rocking eccentric shaft 10. The bars 13 are pivoted concentrically on the shaft 10 so that they oscillate in the same arc at all times. But the bars 12 are mounted upon eccentrics of the shaft 10 so that they may be adjusted to move their wipers 14 out of line with the wipers of the bars 13, thus extending the arc over which each set of the thrust elements is maintained in full lifted position by the cam.

A rotatable operating shaft 9 is mounted in the side of the upper part of the crank case and projecting from the case. This is utilized to rock the shaft 10 to whatever extent may be necessary through the agency of worm and sector gears 11. A governor shaft 2 is located without and parallel to the crank case above the projected end of the shaft 9 preferably connected with the engine to move in synchrony therewith.

Upon the shaft 2 there is mounted a familiar form of centrifugal governor including the fixed and sliding blocks 3 and 4 on the shaft, upon which are pivoted the links 5 mutually connected at their outer ends to the weights 6. The sliding block 4 is connected by a short link 7 to an operating arm 8 adjustable circumferentially upon the shaft 9.

A curved scale plate 19 is mounted on the side of the engine concentric with the shaft 9 and upon the arm 8 there is provided a pointer 20 arranged to indicate on the scale the angle of the cranks of the shaft 1 with respect to dead center when the valves open or close. In the present instance, the cam shaft being assumed to rotate in the direction of the arrow shown in Fig. 2 and Figures 1, 2, 4 all showing the parts in the same operative relation,—one incident to high speed—the pointer would indicate the angle of the crank while descending, with respect to the lower dead center.

A spring 23 is utilized to hold the arm 8 at the extreme limit of its movement to or below zero on the scale, which would represent limitation of the extension or spacing of the wipers 14 relatively to each other to the minimum, or alinement.

With the parts at rest, the arm would be at zero, at which time the parts would be in position with the rollers 14 in coaxial relation, and late short-time opening of the exhaust involved; and upon starting of the engine operation of the governor would move the arm 8 rotating the shaft 10 and drawing the arm 12 outwardly in the direction opposite the rotation of the cam, this would naturally cause earlier opening of the valve involved, and as the arm 13 remains in initial position the opening would be maintained until the cam had passed the second wiper 14 also, an earlier and longer opening of the valve being thus attained.

As the speed of the motor decreases, the spring 23 will overcome the force of the governor, and move the parts toward initial position, until at a predetermined minimum speed the parts will again be in position for a minimum period and late of opening of the exhaust, in accordance with experience and principles well understood in the art.

What is claimed is:—

1. In an engine of the character described, a cam shaft, a countershaft thereadjacent having eccentrics thereon, push pin elements associated with the cam shaft, thrust members interposed between the cam shaft and push pin elements, movable therewith, shiftable thrust members slidably engaged with the first and having cam engaging portions, whereby the cam engaging part associated with each cam may be extended, shiftable thrust members being connected to respective eccentrics on the countershaft, a centrifugal governor geared to the engine, a rock shaft transverse to the countershaft, and geared thereto, yielding means to hold the rock shaft in initial position, a connection between the governor and the rock shaft, a dial, and a pointer arm on the rock shaft coordinated with the dial.

2. In an engine of the character described, a crank case, a push rod, a cam cooperative therewith, a counter shaft having thrust transmitting members thereon interposed between the cam and push rod movable with the latter, and variable in position relatively by rotation of the counter shaft, a worm gear thereon, all the foregoing within the crank case, a control shaft at right angles to the counter shaft having a worm sector thereon meshed with the worm gear and being extended without the crank case, a dial without the case concentric with the control shaft, an adjustable arm and a pointer on the control shaft, a shaft subtending the arc of normal movement of the arm operatively connected with the engine, a centrifugal governor thereon, and operative connections between the governor and arm.

In testimony I affix my signature in presence of two witnesses.

BUNZO ATSUMI. [L. S.]

Witnesses:
K. SUGITA,
GERYI KURIBARA.